(12) United States Patent
Yang et al.

(10) Patent No.: US 10,389,093 B2
(45) Date of Patent: Aug. 20, 2019

(54) INTERLOCKING MECHANISM FOR CIRCUIT BREAKER

(71) Applicant: LSIS CO., LTD., Gyeonggi-do (KR)

(72) Inventors: Hong-Ik Yang, Gyeonggi-do (KR); Kil-Young Ahn, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/788,907

(22) Filed: Oct. 20, 2017

(65) Prior Publication Data

US 2018/0131165 A1   May 10, 2018

(30) Foreign Application Priority Data

Nov. 9, 2016  (KR) .......................... 10-2016-0148666

(51) Int. Cl.
*H02B 11/12* (2006.01)
*H02B 11/133* (2006.01)
*H01H 71/04* (2006.01)
*H01R 13/641* (2006.01)
*H01R 13/703* (2006.01)

(52) U.S. Cl.
CPC ........... *H02B 11/133* (2013.01); *H01H 71/04* (2013.01); *H01R 13/641* (2013.01); *H01R 13/7035* (2013.01)

(58) Field of Classification Search
None
See application file for complete search history.

(56) References Cited

U.S. PATENT DOCUMENTS

| | | | |
|---|---|---|---|
| 5,206,468 A * | 4/1993 | Kobayashi | H02B 11/133 200/50.23 |
| 6,777,627 B1 | 8/2004 | Stevenson | |
| 9,384,908 B2 | 7/2016 | Spies | |
| 9,685,282 B2 * | 6/2017 | Mun | H01H 9/20 |
| 2011/0155545 A1* | 6/2011 | Yang | H02B 11/133 200/50.21 |
| 2011/0233034 A1 | 9/2011 | Park et al. | |
| 2016/0156164 A1* | 6/2016 | Yang | H01H 33/46 200/50.24 |

(Continued)

FOREIGN PATENT DOCUMENTS

| CN | 102820165 A | 12/2012 |
|---|---|---|
| CN | 204424778 U | 6/2015 |

(Continued)

OTHER PUBLICATIONS

Korean Office Action for related Korean Application No. 10-2016-0148666; action dated Feb. 1, 2018; (6 pages).

(Continued)

*Primary Examiner* — Courtney L Smith
(74) *Attorney, Agent, or Firm* — K&L Gates LLP (57) ABSTRACT

Disclosed herein is an interlocking mechanism interlocked with a control power of a circuit breaker. The mechanism includes a control power plug movably installed in a switchgear box, a control power connector detachably coupled to the control power plug, a link connected to the control power connector, a plug interlock assembly connected to and interlocked with the link, and a position switch assembly positioned to face and interlocked with the plug interlock assembly.

14 Claims, 7 Drawing Sheets

(56) References Cited

U.S. PATENT DOCUMENTS

2017/0194112 A1* 7/2017 Park ..................... H01H 9/24

FOREIGN PATENT DOCUMENTS

| | | | |
|---|---|---|---|
| CN | 105655168 | A | 6/2016 |
| EP | 2341590 | A1 | 12/2010 |
| JP | 2003-217432 | A | 7/2003 |
| JP | 4986293 | B2 | 7/2012 |
| KR | 20010036566 | A | 5/2001 |
| KR | 10-0972935 | B1 | 7/2010 |
| KR | 10-1151940 | B1 | 6/2012 |
| KR | 10-2012-0137110 | A | 12/2012 |
| KR | 20-0473529 | Y1 | 7/2014 |
| KR | 10-2016-0064806 | A | 6/2016 |

OTHER PUBLICATIONS

European Search Report for related European Application No. 17196563.5; report dated Nov. 8, 2017; (7 pages).
Chinese Office Action for related Chinese Application No. 201711017985.9; action dated Oct. 29, 2018; (11 pages).

* cited by examiner

FIG. 10

INTERLOCKING MECHANISM FOR CIRCUIT BREAKER

CROSS-REFERENCE TO RELATED APPLICATIONS

This application claims the priority of Korean Patent Application No. 10-2016-0148666 filed on Nov. 9, 2016, in the Korean Intellectual Property Office, the disclosure of which is hereby incorporated by reference in its entirety.

BACKGROUND

1. Technical Field

The present disclosure relates to a control power interlocking mechanism of a circuit breaker, and more particularly, to a control power interlocking mechanism of a circuit breaker allowing a user to check whether a control power plug is inserted outside a switchgear box by using a mechanism interlocked with the control power plug.

2. Description of the Related Art

Generally, a circuit breaker is installed together with a switchgear in which various electric devices including the breaker for operation and control of power plants and substations, and operation of electric motors are placed for management.

The circuit breaker may be divided into a fixed-type circuit breaker and a truck-type circuit breaker. The fixed-type circuit breaker consists only of the breaker itself and thus is fixed to a panel in the switchgear. The truck-type circuit breaker has a case called as a cradle for easy maintenance of the breaker, and thus can be moved into/out of the switchgear.

In addition, the switchgear has a run position where the busbar of the cradle is connected to the load terminal such that voltage and current are supplied to the busbar of the circuit breaker and the load terminal, and a test position where they are separated from the terminals of the cradles to allow for operation test of the breaker only.

In order to deliver electric signals to the circuit breaker to turn on/off it at the run position and the test position, the busbar of the cradle of the circuit breaker may be inserted and removed. To this end, a control power plug is inserted into the circuit breaker.

If the breaker is inserted into or taken out of the switchgear while the control power plug is not inserted, or if the control circuit is pulled out by the user at the operation position, the breaker may fail to operate in case of emergency.

That is, a user cannot check if the control power plug is normally inserted outside or at a remote location of the switchgear. Accordingly, if the plug is not normally inserted, an accident such as a short circuit may occur when the breaker is moved to the operation position. This may cause a problem of electrical misoperation.

SUMMARY

It is an object of the present disclosure to provide a mechanism interlocked with a control circuit plug for connecting a control power of a circuit breaker, so that a user can check if the control power plug of the circuit breaker is normally inserted outside a switchgear, and the circuit breaker can be operated stably.

It is another object of the present disclosure to provide a position switch assembly that can be implemented with a simple structure, which is interlocked with the control power plug so that a user can check if the control power plug is normally inserted into a control power connector outside the switchgear.

In accordance with one aspect of the present disclosure, an interlocking mechanism interlocked with a control power of a circuit breaker includes a control power plug movably installed in a switchgear box, a control power connector detachably coupled to the control power plug, a link connected to the control power connector, a plug interlock assembly connected to and interlocked with the link depending on whether the control power plug is coupled with the control power connector, and a position switch assembly positioned to face and interlocked with the plug interlock assembly.

The plug interlock assembly may include a connecting link connected to the link, an interlock lever having one side rotatably coupled with the connecting link, a level support with which the interlock lever is rotatably coupled, and connecting pivots for connecting the connecting link with the interlock lever and for connecting the interlock lever with the lever support.

The connecting link may include a slit for coupling with the lever support by the connecting pivot, an interlock plate for pressing the position switch assembly, and a link connecting portion for coupling with the link.

The interlock lever may include a fixed block inserted into or removed from a rail groove formed in a rail assembly a first coupling hole for the interlock lever to couple with the lever support via a hinge, and a second coupling hole for coupling with the connecting link.

The fixed block may be formed on one side of the interlock lever, the second coupling hole may be formed on an opposed side of the interlock lever, and the first coupling hole may be formed between the fixed block and the second coupling hole.

The position switch assembly may include: a position switch member positioned to face the plug interlock assembly and interlocked with movement of the plug interlock assembly; an elastic member elastically supporting the position switch member so that it reciprocates, an interlocking switch coupled to the position switch member and interlocked with the movement of the position switch member, and a switch box comprising a switch turned on/off by the interlocking switch.

The position switch assembly may further include a main body on which the elastic member is mounted, the elastic member elastically supporting the position switch member, wherein the position switch member is coupled with the main body so that it reciprocates, and a guide slit for guiding the interlocking switch is formed in the main body.

The interlocking switch may include a push body coupled with the position switch member, and a moving switch interlocked with the movement of the push body to turn on/off the switch of the switch box.

The switch box may further include a display unit for indicating on/off states of the switch, and when the push body turns on the switch of the switch box, the display unit indicates that the control power plug is connected to the control power connector so that it is seen from outside the main body.

The position switch assembly may include: a position switch member facing the fixed block of the interlock lever and positioned to be interlocked with the movement of the fixed block; an interlocking member coupled with the position switch member and interlocked with the movement of the position switch member, and a switch box comprising a switch turned on/off in response to movement of the interlocking member.

The switch box may further include a display unit for indicating an on/off states of the switch, and when the control power plug is connected to the control power connector, the fixed block is removed from the rail groove formed in the rail assembly, the position switch member is moved, the interlocking member is rotated by the movement of the position switch member, the switch is turned on by the rotation of the interlocking member, and the display unit indicates that the control power plug is connected to the control power connector so that it is seen from outside a main body.

Particulars of various exemplary embodiments of the present invention are included in the detailed description and the accompanying drawings.

According to an exemplary embodiment of the present disclosure, when a user removed a control circuit plug in an abnormal situation or the control circuit plug is removed, the user can monitor it outside or at a remote location of a switchgear by the interlocking mechanism, so that the circuit breaker can operate stably and reliably.

These and other aspects, embodiments and advantages of the present disclosure will become immediately apparent to those of ordinary skill in the art upon review of the Detailed Description and Claims to follow.

DETAILED DESCRIPTION

Various advantages and features of the present invention and methods accomplishing thereof will become apparent from the following description of embodiments with reference to the accompanying drawings. Therefore, it should be noted that the spirit of the present disclosure is not limited to the embodiments set forth herein and those skilled in the art could easily accomplish other embodiments. The exemplary embodiments are provided for making the disclosure of the present disclosure thorough and for fully conveying the scope of the present disclosure to those skilled in the art. It is to be noted that the scope of the present disclosure is defined solely by the claims The terminology used herein is for the purpose of describing embodiments only and is not intended to be limiting. As used herein, the singular forms are intended to include plural forms as well, unless the context clearly indicates otherwise. It will be further understood that the terms "comprises" and/or "has" when used in this description, specify the presence of stated feature, number, step, operation, component, element, or a combination thereof but do not preclude the presence or addition of one or more other features, numbers, steps, operations, components, elements, or combinations thereof The terms used herein, including technical terms, have the same meanings as terms that are generally understood by those skilled in the art, as long as the terms are not explicitly defined differently. It should be understood that terms defined in a commonly used dictionary have meanings coinciding with those of terms in the related technology. As long as the terms are not defined obviously, they are not ideally or excessively analyzed as formal meanings.

Hereinafter, exemplary embodiments of the present disclosure will be described in detail with reference to the accompanying drawings.

Figure 1:
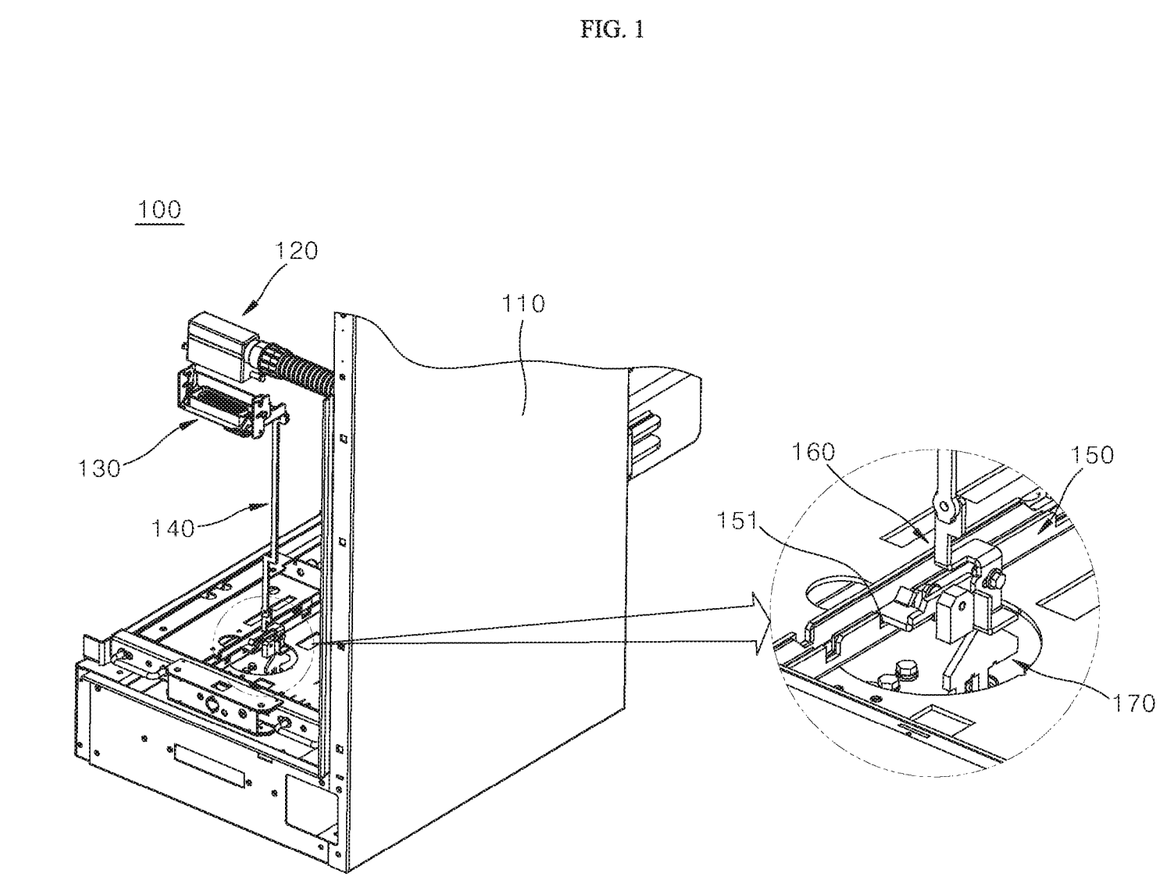
FIG. 1 is a view schematically showing a control power interlocking mechanism of a circuit breaker according to a first exemplary embodiment of the present disclosure.

FIG. 1 is a view schematically showing a control power interlocking mechanism of a circuit breaker according to a first exemplary embodiment of the present disclosure.

As shown in FIG. 1, a switchgear box 110 includes a control power plug 120, a control power connector 130, a link 140, a rail assembly 150, a plug interlock assembly 160, and a position switch assembly 170.

The control power plug 120 is movable in the switchgear box 110. The control power plug 120 is detachably coupled to the control power connector.

FIG. 1 shows the control power plug 120 before it is inserted into the control power connector 130. The link 140 connects the control power connector 130 with the plug interlock assembly 160.

The link 140 is moved up and down depending on whether the control power plug 120 is inserted into the control power connector 130.

More specifically, when the control power plug 120 is inserted into the control power connector 130, the link is driven downward, and the plug interlock assembly 160 is interlocked therewith.

The plug interlock assembly 160 is moved while being supported by the rail assembly 150. The position switch assembly 170 is disposed under the plug interlock assembly 160 and is interlocked with the movement of the plug interlock assembly 160.

Figure 4:
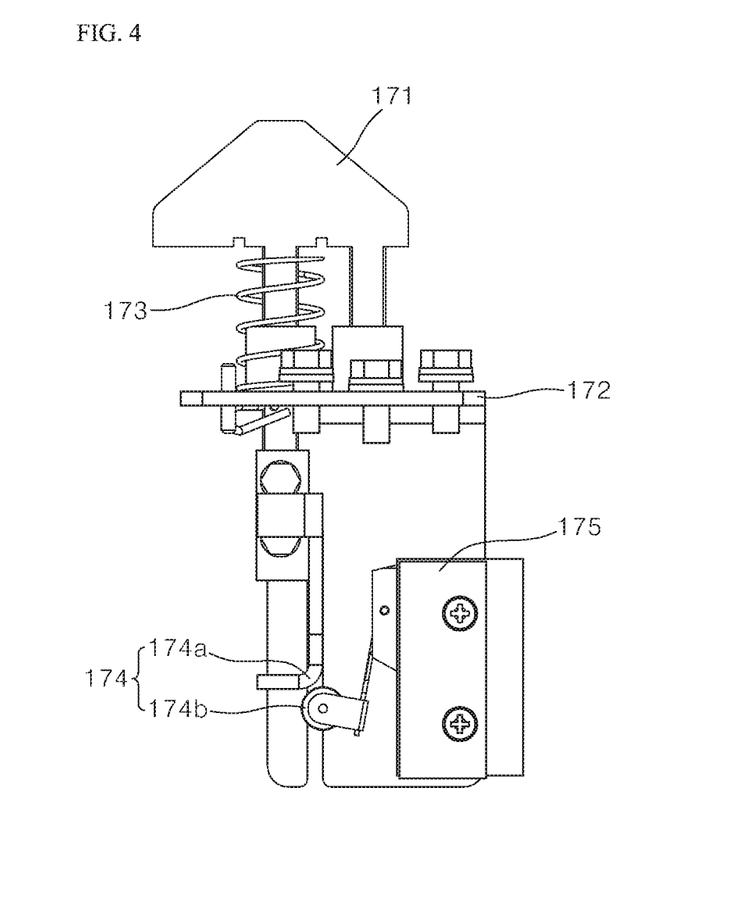
FIG. 4 is a schematic view of the position switch assembly shown in FIG. 3.

The interlocking mechanism of the link 140, the plug interlock assembly 160 and the position switch assembly 170 depending on whether the control power plug 120 is inserted into the control power connector 130 will be described in detail below with reference to FIGS. 4 and 5.

Figure 2:
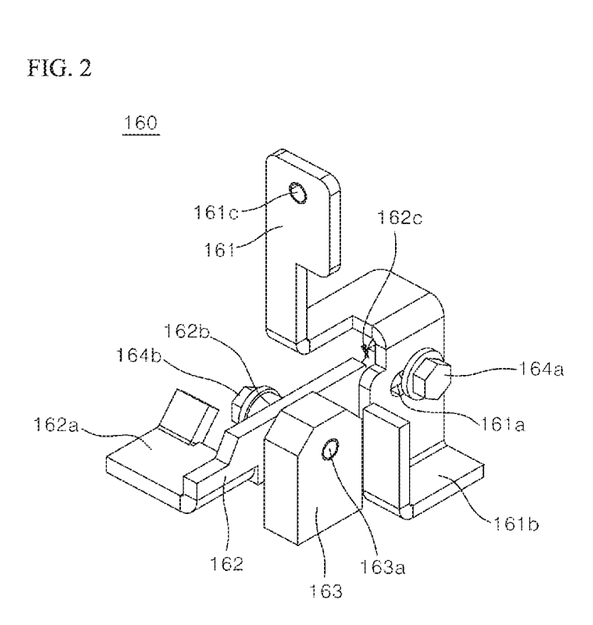
FIG. 2 is a perspective view schematically showing the plug interlock assembly in the control power interlocking mechanism of the circuit breaker in the circuit breaker shown in FIG. 1.

FIG. 2 is a perspective view schematically showing the plug interlock assembly in the control power interlocking mechanism of the circuit breaker in the motor protection circuit breaker shown in FIG. 1.

As shown in FIG. 2, the plug interlock assembly 160 includes a connecting link 161, an interlock lever 162, a lever support 163, and a first connecting pivot 164a and a second connecting pivot 164b.

More specifically, the connecting link 161 includes a slit 161a, an interlock plate 161b, and a link connecting portion 161c. A first connecting pivot 164a is inserted into the slit 161a. The first connecting pivot 164a is coupled with a second coupling hole 162b of the interlock lever 162 through the guide slit 161a.

The slit 161a may be formed as an insertion hole for improving the workability of coupling the first connecting pivot 164a.

The interlock plate 161b is for transmitting the pressure according to the movement of the plug interlock assembly 160 to the position switch assembly 170 as the connecting link 161 moves.

The link connecting portion 161c is for connecting the plug interlock assembly 160 to the link 140. It may have a through hole and may be connected to the link 140 in various manners by a connection member.

The interlock lever 162 is rotated while being coupled to the lever support 163 via a hinge according to whether the control power plug 120 is coupled with the control power connector 130. Accordingly, it is inserted into or removed from the rail groove 151 (see FIG. 1) formed in the rail assembly 150.

To this end, one end of the interlock lever 162 is rotatably coupled to the connecting link 161, and a fixed block 162a, a first coupling hole 162b, and a second coupling hole 162c are formed.

The fixed block 162a is inserted into or removed from the rail groove formed in the rail assembly 150. The first coupling hole 162 is to fix the interlock lever 162 to the lever support 163 via a hinge. The second coupling hole 162b is to be inserted into the slit 161a of the connecting link 161.

The fixed block 162a is disposed at one side of the interlock lever 162. The first coupling hole 162b is formed at the central portion of the interlock lever 162. The second coupling hole 162c is formed at the opposed side of the interlock lever 162.

The lever support 163 has a lever hinge 163a for rotatably coupling with the interlock lever 162.

The second connecting pivot 164b is coupled to the lever hinge 163a of the lever support 163 through the first coupling hole 162b.

Accordingly, when the connecting link 161 is moved up and down, the interlock lever 162 is fixed to the lever support 163 via a hinge and is rotated about the hinge axis, and the fixed block 162a is rotated accordingly.

Figure 3:
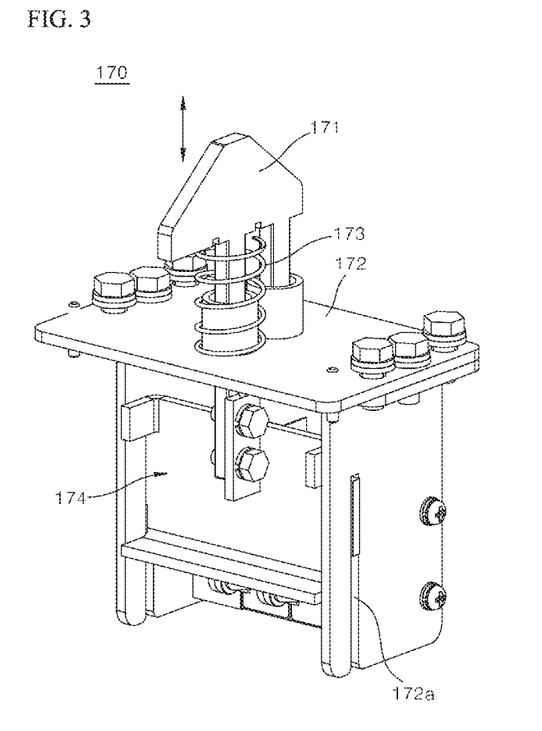
FIG. 3 is a perspective view schematically showing the position switch assembly in the control power interlocking mechanism of the circuit breaker shown in FIG. 1.

FIG. 3 is a perspective view schematically showing the position switch assembly in the control power interlocking mechanism of the circuit breaker in the motor protection circuit breaker shown in FIG. 1. FIG. 4 is a schematic view of the position switch assembly shown in FIG. 3.

As shown in the drawings, the position switch assembly 170 includes a position switch member 171, a main body 172, an elastic member 173, an interlock switch 174, and a switch box 175.

More specifically, the position switch member 171 is positioned to face the plug interlock assembly 160 as shown in FIG. 1.

As the plug interlock assembly 160 moves, it is pressed by the interlock plate 161b of the connecting link 161 and is interlocked with it.

The position switch member 171 is coupled to the main body 172 such that it can reciprocate while being elastically supported by the elastic member 173.

The interlock switch 174 is coupled to the position switch member 171.

The interlock switch 174 is interlocked with the reciprocating movements of the position switch member 171 to turn switches of the switch box 175 on or off.

To this end, the interlock switch 174 includes a push body 174a and a moving switch 174b. The push body 174a moves the moving switch 174b in accordance with the reciprocating movement of the interlocking switch 174. It is mounted on the main body 172 so that it is in contact with or not in contact with the moving switch 174b in accordance with the movement of the interlocking switch 174.

In addition, the interlocking switch may be implemented as a variety of elements such as a lever interlocked with the reciprocating movement of the position switch member 171.

A guide slit 172a for guiding the interlocking switch 174 may be formed in the main body 172.

The moving switch 174b is mounted on the main body 172 such that it can reciprocate. The moving switch 174b is coupled with the main body 172 with its one side being elastically supported on the main body 172, so that it is restored to its original position when it is not pressed by the push body 174a.

The push body 174a is located above the moving switch 174b, such that it presses the moving switch 174b when it is lowered, and the moving switch 174b is pushed toward one side by the push body 174a.

Next, the switch box 175 includes switches (not shown) that are turned on or off by the moving switch 174b, and a display unit (not shown) to indicate whether the switches are turned on or off.

Figure 5:
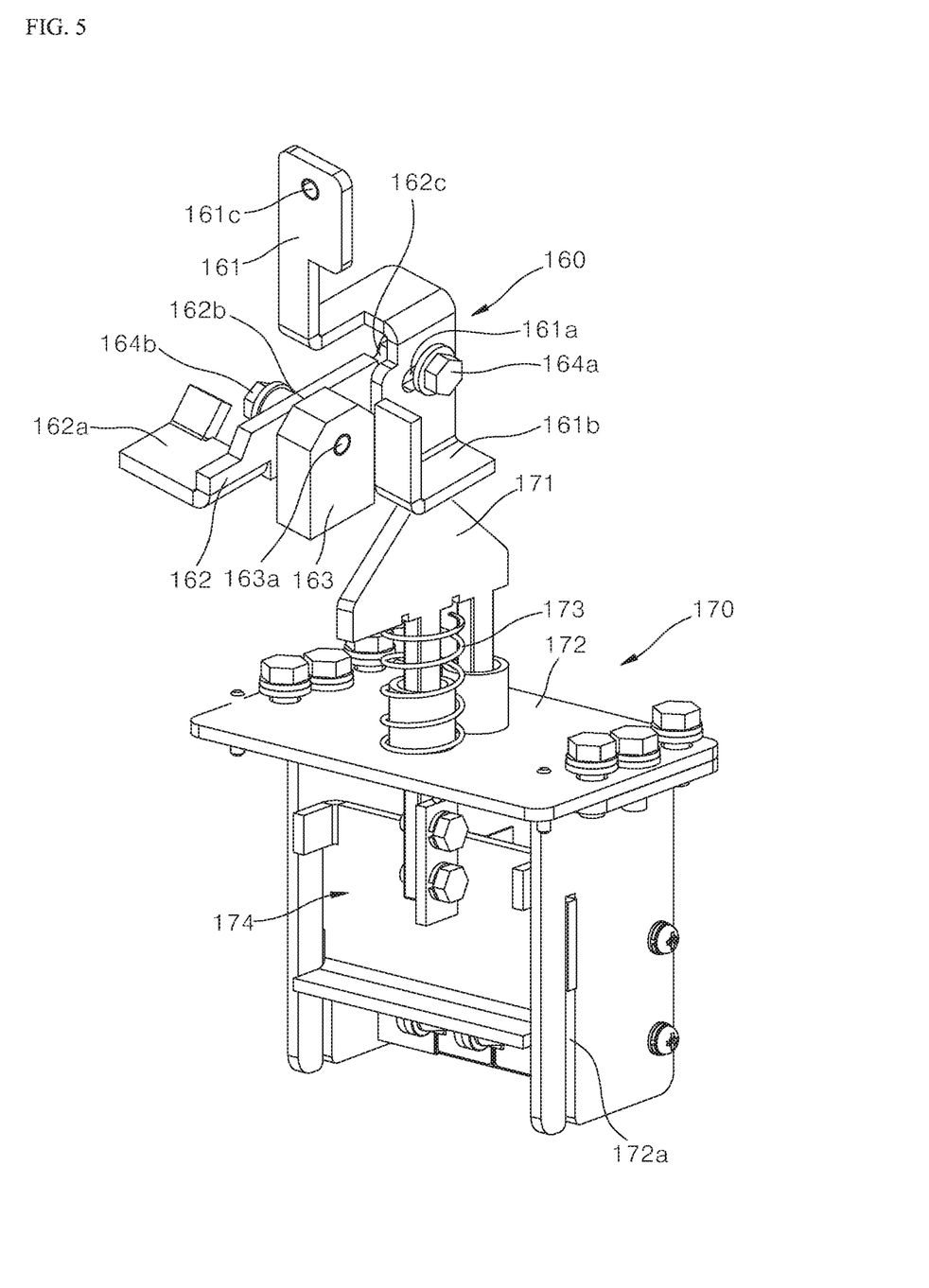
FIGS. 5 and 6 are schematic views for illustrating the plug interlock assembly and the position switch assembly in the circuit breaker shown in FIG. 1 which are interlocked with each other in use.
Figure 6:
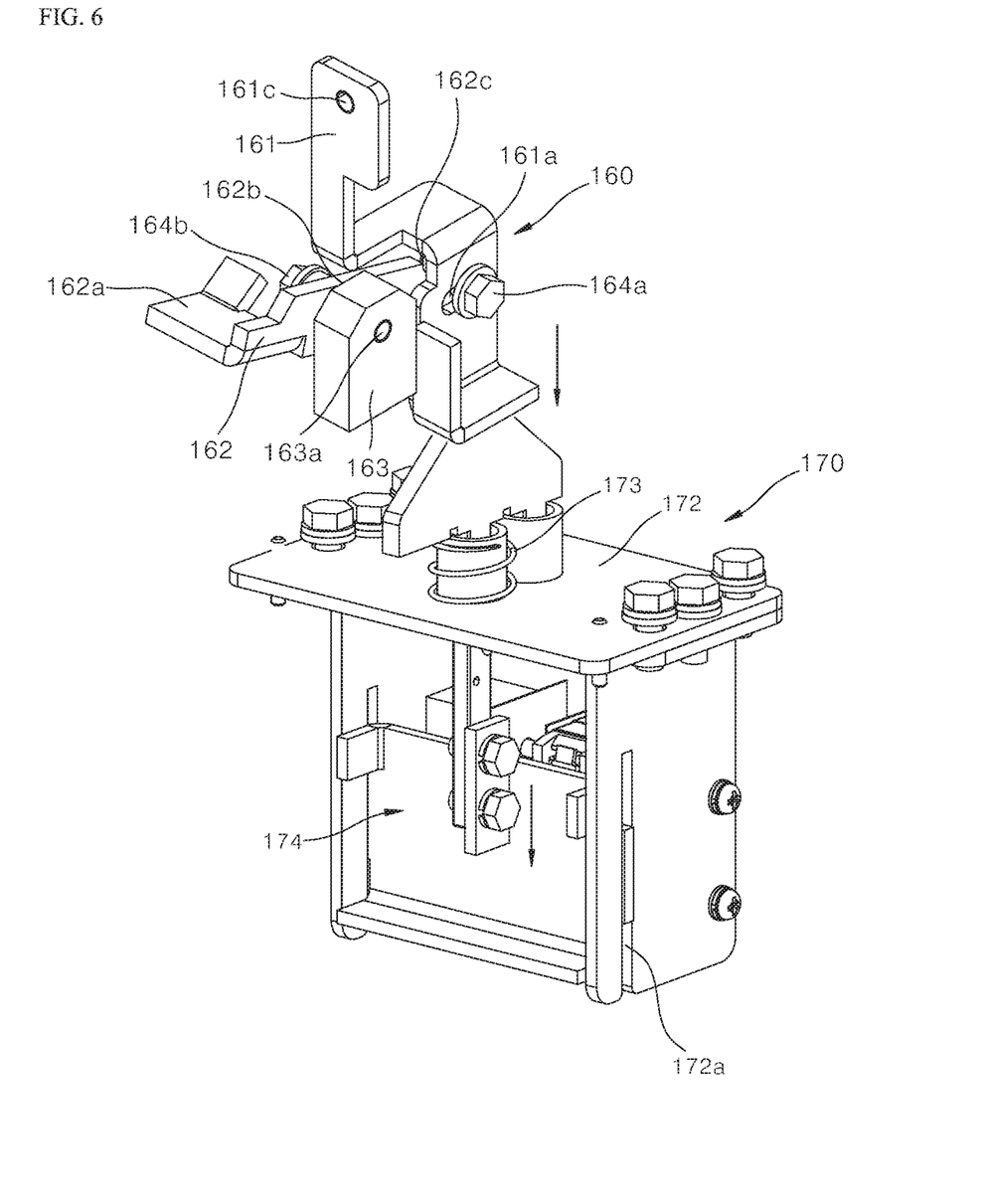
Figure 7:
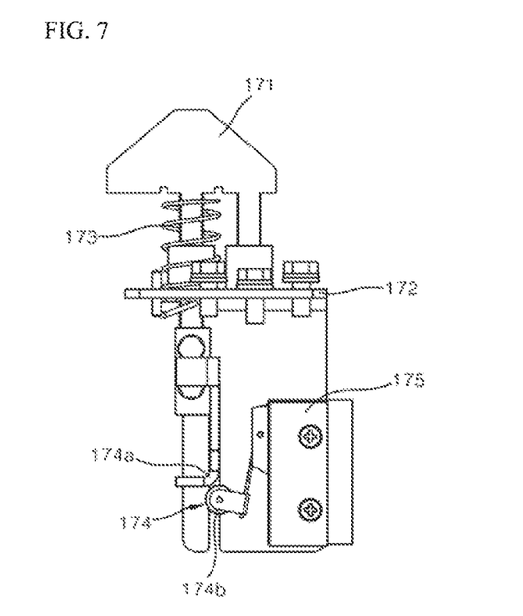
FIGS. 7 and 8 are views schematically showing the position switch assembly in the control power interlocking mechanism of the circuit breaker shown in FIG. 1 in operation.
Figure 8:
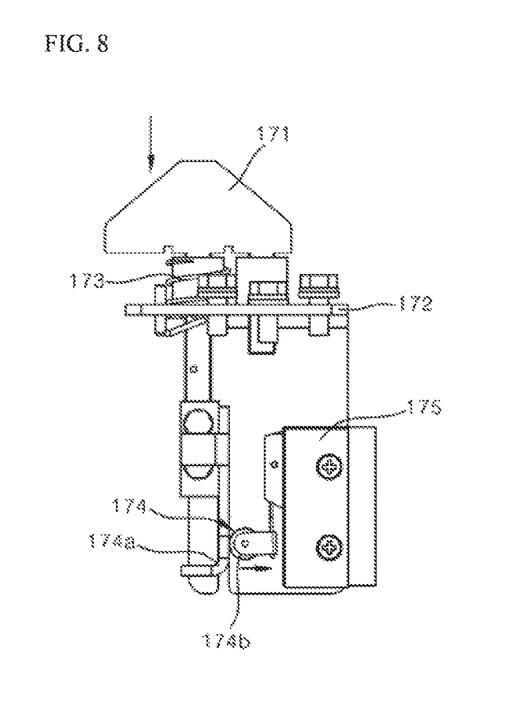

FIGS. 5 and 6 are schematic views for illustrating the plug interlock assembly and the position switch assembly in the motor protection circuit breaker shown in FIG. 1 which are interlocked with each other in use. FIGS. 7 and 8 are views showing the position switch assembly in the motor protection circuit breaker shown in FIG. 1 in use.

As shown in the drawings, the plug interlock assembly 160 is disposed above the position switch assembly 170.

More specifically, the position switch member 171 of the position switch assembly 170 is positioned under the interlock plate 161b of the plug interlock assembly 160.

FIGS. 5 and 7 show the control power plug before it is inserted into the control power connector, in which the link 140 (see FIG. 1) is not lowered, and the interlock lever 162 of the plug interlock assembly 160 is inserted into the rail groove formed in the rail assembly 150.

FIGS. 6 and 8 show the control power plug after it is inserted into the control power connector, in which the link is lowered, and the plug interlock assembly 160 is lowered interlocked with the link.

At this time, the interlock lever 162 is rotated so that the fixed block 162a is removed from the rail groove 151 (see FIG. 1) formed in the rail assembly 150. Further, the interlock plate 161b presses the position switch member 171 while it is lowered, and the position switch member 171 moves down in association with the movement of the interlock plate 161b.

Then, as the position switch member 171 is lowered, the push body 174a of the position switch member 171 moves the moving switch 174b, the moving switch 174b operates the on/off switches mounted on the switch box 175, and the display unit indicates it so that it can be seen from the outside of the main body.

Accordingly, the user can check that the control power plug is connected to the control power connector through the display unit from the outside of the switchgear box, and can prevent erroneous operation.

Figure 9:
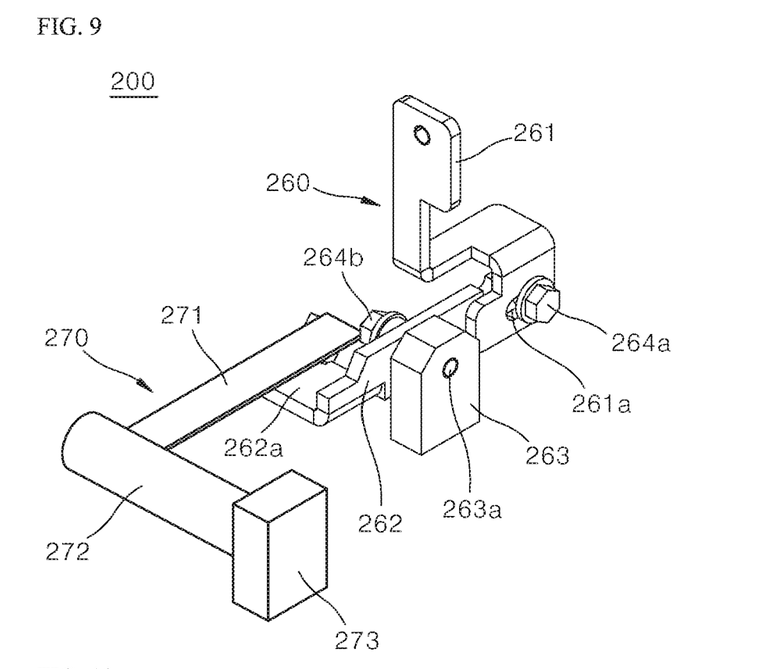
FIG. 9 is a view showing a control power interlocking mechanism of a circuit breaker according to a second exemplary embodiment of the present disclosure.

FIG. 9 is a view showing a control power interlocking mechanism of a circuit breaker according to a second exemplary embodiment of the present disclosure.

The control power interlocking mechanism 200 of the circuit breaker shown in FIG. 9 is substantially identical to the control power interlocking mechanism 100 of the circuit breaker according to the first embodiment except for the plug interlock assembly and the position switch assembly.

More specifically, a plug interlock assembly 260 includes a connecting link 261, an interlock lever 262, a lever support 263, and connecting pivots 264a and 264b.

The shapes of the connecting link 261, the interlock lever 262, the lever support 263 and the connecting pivots 264a and 264b and their organic connections are identical to those of the control power interlocking mechanism of the circuit breaker according to the first embodiment; and, therefore, the redundant description will be omitted.

Then, a position switch assembly 270 includes a position switch member 271, an interlocking member 272, and a switch box 273.

More specifically, the position switch member 271 faces the fixed block 262a of the interlock lever 262 and positioned to be interlocked with the movement of the fixed block 262a.

That is, one side of the position switch member 271 is positioned to face the fixed block 262a, and the opposed side is coupled to the interlocking member 272.

The interlocking member 272 is coupled to the position switch member 271 so that it is rotated in accordance with the movement of the position switch member 271.

The switch box 273 includes switches that are turned on or off in response to the rotation of the interlocking member 272. In addition, the switch box 273 may further include a display unit for indicating on/off states of the switches.

Hereinafter, the operation of the control power interlocking mechanism of the circuit breaker according to the second embodiment of the present disclosure will be described in more detail.

FIG. 9 shows the control power plug before it is inserted into the control power connector, in which the link 140 (see FIG. 1) is not lowered, and the interlock lever 162 of the plug interlock assembly 260 is inserted into the rail groove formed in the rail assembly.

Figure 10:
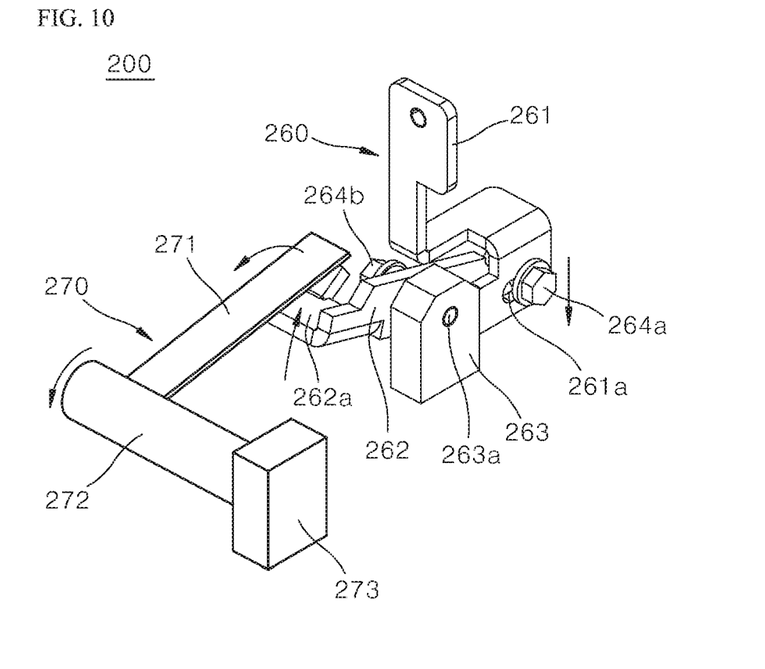
FIG. 10 is a view for illustrating the plug interlock assembly and the position switch assembly of the control power interlocking mechanism in the circuit breaker shown in FIG. 8 which are interlocked with each other in use.

FIG. 10 shows the control power plug after it is inserted into the control power connector, in which the link is lowered, and the plug interlock assembly 260 is lowered interlocked with the link.

The interlock lever 262 is rotated so that the fixed block 262a of the interlock lever 262 is removed from the rail groove formed in the rail assembly, and the fixed block 262a moves the switch member 271 of the position switch assembly 270.

The switch member 271 is interlocked with the interlock lever 262 and rotates the interlocking member 272. The interlocking member 272 is interlocked with the switch member 271 and operates the switches mounted on the switch box 273. The display unit indicates to the outside of the main body that the control power plug is connected to the control power connector.

In the above-described manner, a user can check if the control power plug of the circuit breaker is normally inserted via the switch box from the outside of the switchgear box with a more simpler structure, and thus can prevent erroneous operation.

Although the exemplary embodiments of the present disclosure has been described with reference to the accompanying drawings, those skilled in the art will appreciate that various modifications and alterations may be made without departing from the spirit or essential feature of the present disclosure. Therefore, it should be understood that the above-mentioned embodiments are not limiting but illustrative in all aspects.

What is claimed is:

1. An interlocking mechanism interlocked with a control power of a circuit breaker included in a switchgear box, the mechanism comprising:
   a control power plug movably installed in the switchgear box;
   a control power connector detachably coupled to the control power plug;
   a link connected to the control power connector;
   a plug interlock assembly connected to and interlocked with the link; and
   a position switch assembly positioned to face and interlocked with the plug interlock assembly,
   wherein the position switch assembly comprises:
      a position switch member positioned to face the plug interlock assembly and interlocked with movement of the plug interlock assembly,
      an elastic member elastically supporting the position switch member so that it reciprocates,
      an interlocking switch coupled to the position switch member and interlocked with the movement of the position switch member, and
      a switch box turned on/off by the interlocking switch,
   wherein the switch box further comprises a display unit for indicating an on/off state of the switch box, and the display unit indicates connecting status for the control power plug and the control power connector so that it is seen from outside a main body.

2. The interlocking mechanism of claim 1, wherein the plug interlock assembly comprises:
   a connecting link connected to the link,
   an interlock lever having one side coupled with the connecting link,
   a level support with which the interlock lever is rotatably coupled,
   a first connecting pivot for connecting the connecting link with interlock lever, and
   a second connecting pivot for connecting the interlock lever with the lever support.

3. The interlocking mechanism of claim 2, wherein the connecting link comprises:
   a slit for coupling with the lever support by the connecting pivot,
   an interlock plate for pressing the position switch assembly, and
   a link connecting portion for coupling with the link.

4. The interlocking mechanism of claim 2, wherein the interlock lever comprises:
   a fixed block inserted into or removed from a rail groove formed in a rail assembly,
   a first coupling hole for the interlock lever to couple with the lever support via a hinge, and
   a second coupling hole for coupling with the connecting link.

5. The interlocking mechanism of claim 4, wherein:
   the fixed block is formed on one side of the interlock lever,
   the second coupling hole is formed on an opposed side of the interlock lever, and
   the first coupling hole is formed between the fixed block and the second coupling hole.

6. The interlocking mechanism of claim 1, wherein the position switch assembly further comprises:
   the main body on which the elastic member is mounted, the elastic member elastically supporting the position switch member, wherein:
   the position switch member is coupled with the main body so that it reciprocates, and
   a guide slit for guiding the interlocking switch is formed in the main body.

7. The interlocking mechanism of claim 1, wherein the interlocking switch (174) comprises:
   a push body coupled with the position switch member, and
   a moving switch interlocked with the movement of the push body to turn on/off the switch box.

8. The interlocking mechanism of claim 7,
   wherein when the push body turns on the switch box, the display unit indicates that the control power plug is connected to the control power connector so that it is seen from outside the main body.

9. An interlocking mechanism interlocked with a control power of a circuit breaker included in a switchgear box, the mechanism comprising:
   a control power plug movably installed in the switchgear box;
   a control power connector detachably coupled to the control power plug;
   a link connected to the control power connector;
   a plug interlock assembly connected to and interlocked with the link; and
   a position switch assembly positioned to face and interlocked with the plug interlock assembly,
   wherein the position switch assembly comprises:
      a position switch member facing the fixed block of the interlock lever and positioned to be interlocked with the movement of the fixed block,
      an interlocking member coupled with the position switch member and interlocked with the movement of the position switch member, and
      a switch box turned on/off in response to movement of the interlocking member,
   wherein the switch box further comprises a display unit for indicating an on/off state of the switch box, and the display unit indicates connecting status for the control power plug and the control power connector so that it is seen from outside a main body.

10. The interlocking mechanism of claim 9, wherein the plug interlock assembly comprises:
    a connecting link connected to the link,
    an interlock lever having one side coupled with the connecting link,
    a level support with which the interlock lever is rotatably coupled,
    a first connecting pivot for connecting the connecting link with interlock lever, and
    a second connecting pivot for connecting the interlock lever with the lever support.

11. The interlocking mechanism of claim 10, wherein the connecting link comprises:
    a slit for coupling with the lever support by the connecting pivot, and
    a link connecting portion for coupling with the link.

12. The interlocking mechanism of claim 10, wherein the interlock lever comprises
    a fixed block inserted into or removed from a rail groove formed in a rail assembly,
    a first coupling hole for the interlock lever to couple with the lever support via a hinge, and
    a second coupling hole for coupling with the connecting link.

13. The interlocking mechanism of claim 12, wherein:
    the fixed block is formed on one side of the interlock lever,
    the second coupling hole is formed on an opposed side of the interlock lever, and
    the first coupling hole is formed between the fixed block and the second coupling hole.

14. The interlocking mechanism of claim 13, wherein when the control power plug is connected to the control power connector, the fixed block is removed from the rail groove formed in the rail assembly, the position switch member is moved, the interlocking member is rotated by the movement of the position switch member, the switch box is turned on by the rotation of the interlocking member, and the display unit indicates that the control power plug is connected to the control power connector so that it is seen from outside the main body.

* * * * *